Patented Nov. 11, 1924.

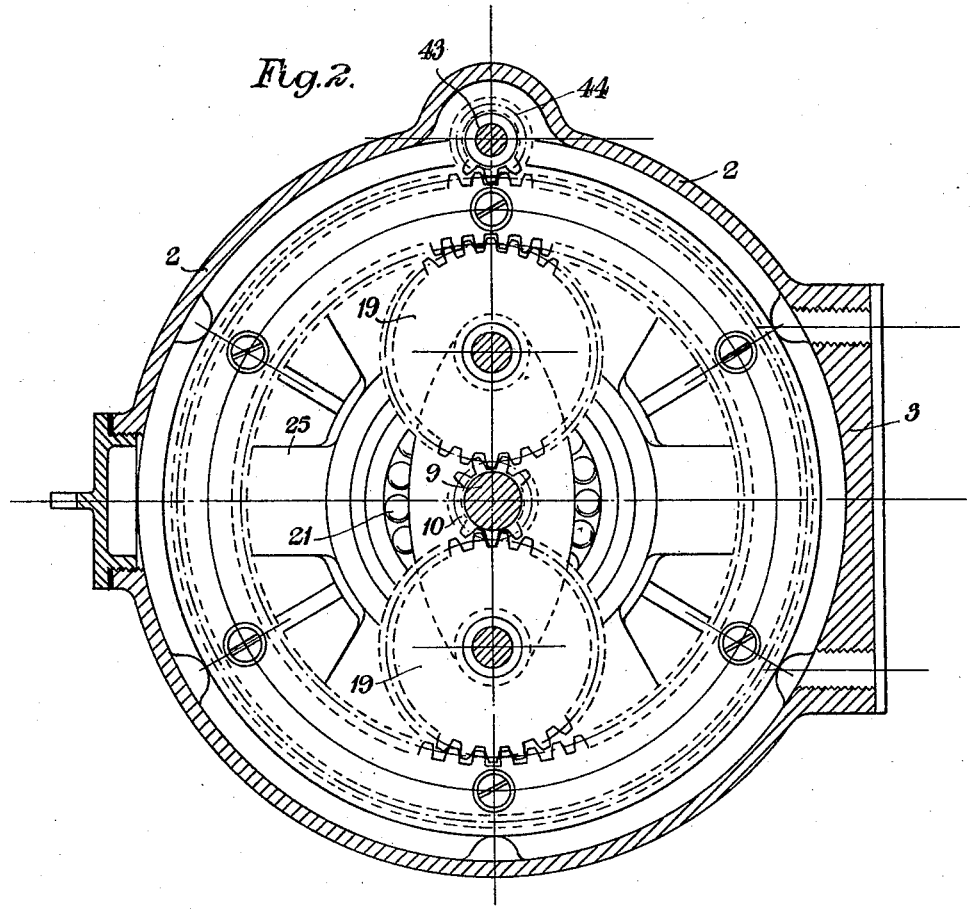

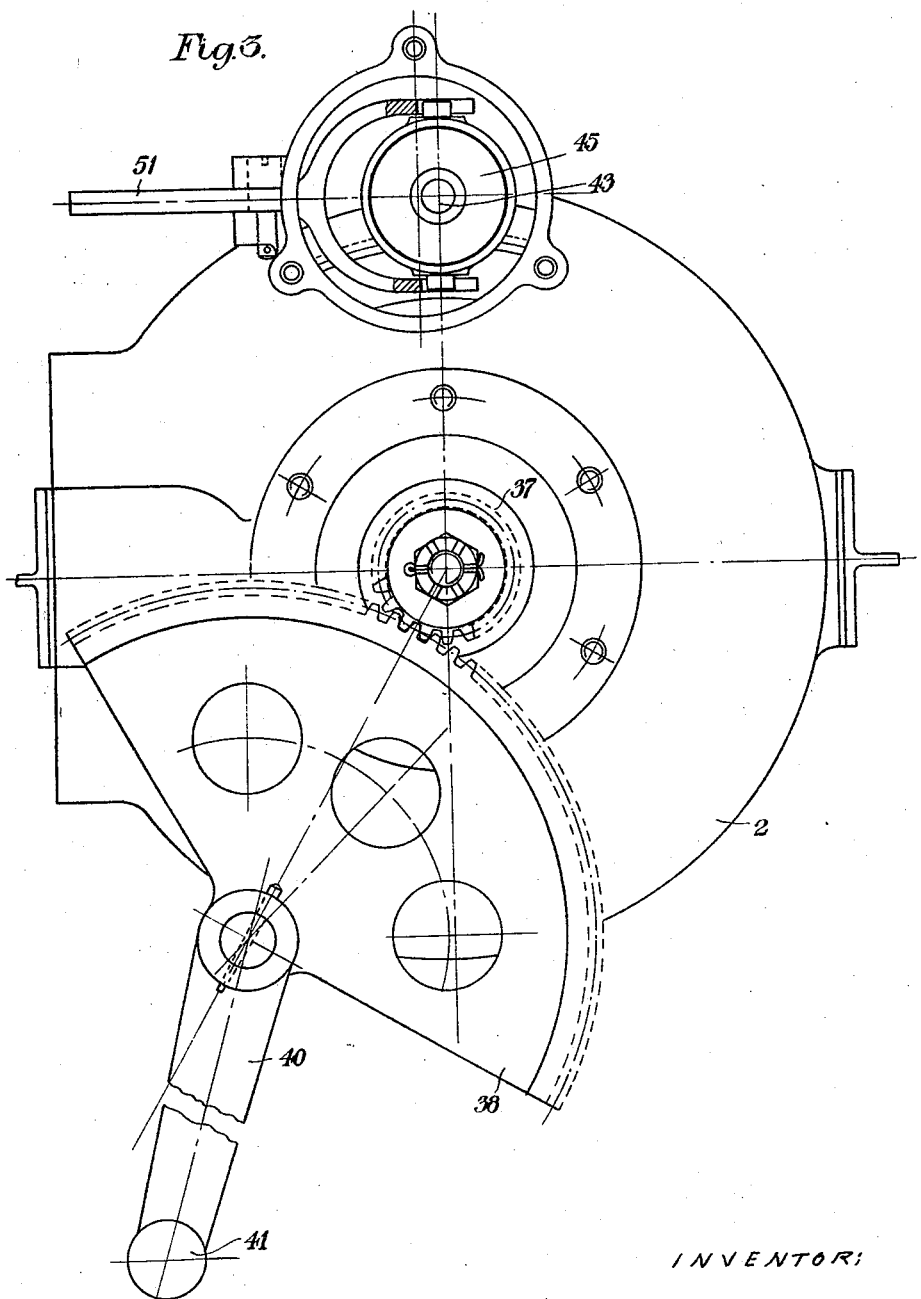

1,514,601

UNITED STATES PATENT OFFICE.

WESTGARTH STANHOPE FORSTER BROWN, OF HASLEMERE, ENGLAND.

VARIABLE-SPEED GEAR.

Application filed March 30, 1921. Serial No. 456,855.

*To all whom it may concern:*

Be it known that I, WESTGARTH STANHOPE FORSTER BROWN, of Great Stoatley, Haslemere, in the county of Surrey, England, a subject of the King of Great Britain and Ireland, have invented certain new and useful Improvements in or Relating to Variable-Speed Gears, of which the following is a specification.

This invention relates to variable speed gears of the epicyclic type.

The object of this invention is to provide an improved form of epicyclic speed gear to give an infinitely variable ratio from a fixed ratio to zero and particularly adapted for use on motor cycles, motor vehicles and the like.

A variable speed gear made in accordance with this invention comprises, a sun wheel, a cage carrying planet wheels, an epicyclic hollow gearing drum provided with external and internal teeth, means for driving the sun wheel from the engine, means for conveying the drive from the planet wheel cage, a stationary casing, a shaft mounted in said casing carrying a pinon to mesh with the external teeth of the epicyclic hollow gearing drum, and means on the countershaft to control the rotation of the said shaft and pinion, said means being independent of the rotating elements of the gear.

Referring to the drawings filed herewith:—

Fig. 2 is a sectional end view of Fig. 3;

Fig. 3 is an outside view.

Figure 1:
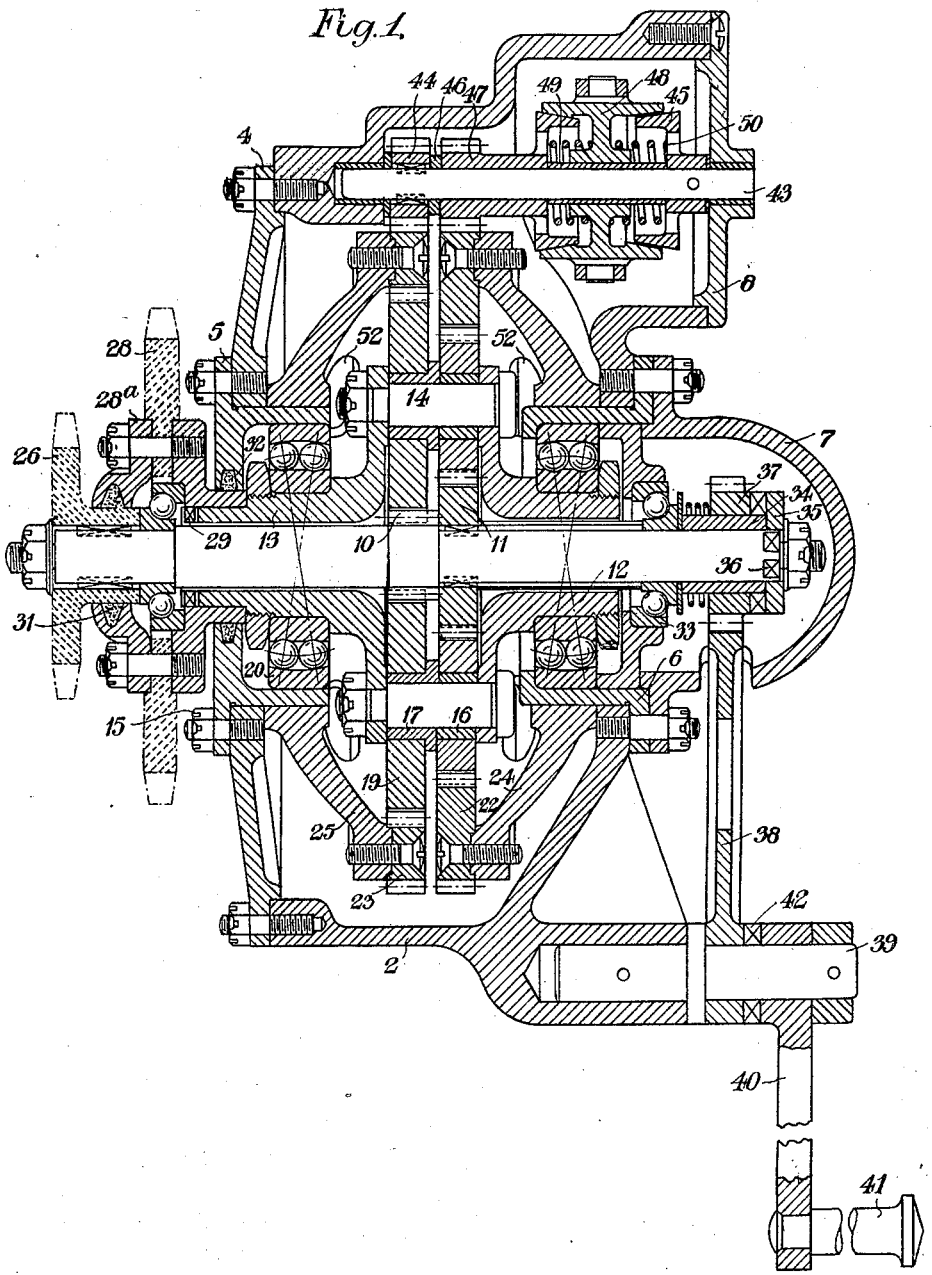
Fig. 1 is a sectional elevation of a variable speed gear made in accordance with this invention and having two ratios of gearing.

In the form shown in the drawings, the gear comprises a casing 2 provided with a suitable boss 3 for mounting the casing on a motor cycle. The casing is provided at one end with an end cover 4 and bearing housing 5 and at the other end with a bearing housing 6, a cover 7 and an auxiliary cover 8.

Within the casing is disposed a double ratio epicyclic gear comprising a main or driven shaft 9 being formed with a gear wheel 10 and carrying a slightly larger gear wheel 11 keyed thereto. These are the sun wheels of the epicyclic gears. Rotatably mounted on the shaft is a pinion cage formed in two parts 12 and 13 disposed with the gear wheels between them and secured together by bolts 14 and 15. On the bolts are disposed bushings 16 and 17 on which are carried the pinions 18 and 19 of slightly different diameters and meshing with the gears 11 and 10 respectively. The parts 12 and 13 of the cage are provided with self aligning ball bearings 20 and 21 respectively which are supported in their housings 5 and 6 of the frame. Two drums 22 and 23 toothed internally and externally mesh internally with the respective pinions 18 and 19. The drums 22 and 23 are carried by dished members 24 and 25 which are mounted on bearings formed on the bearing housing. The end of the shaft 9 is adapted to receive a chain sprocket 26 and a chain sprocket carrier 27, and sprocket 28 are mounted on the extension of the pinon cage part 13. The chain sprocket carrier 27 is provided with dogs 29 engaging with dogs on the end of the part 13, and also forms a carrier for a ball bearing 30 for the end of the shaft. A clamp piece 28ª is provided with the carrier. Oil retaining rings 31 and 32 are provided. The other end of the shaft 9 is provided with a ball bearing 33, a bushing 34, a ratchet plate 35 on flats 36 on the end of the shaft, and a spur wheel 37 having ratchet teeth on one face to engage with those on the ratchet plate 35. A kickstarter quadrant 38 is mounted on a spindle 39 carried on the casing and engages with the pinon 37. A starter lever 40 provided with a bolt 41 is also carried on the spindle 39 the parts 38 and 39 having mutually engaging dogs 42. A countershaft 43 is mounted in the casing and has a pinion 44 keyed onto one end and a clutch cone member 45 pinned onto the other end. A distance piece 46, a combined pinion and clutch cone member 47, a selector clutch 48 with springs 49 and 50 are all rotatably mounted on the countershaft 43. The pinons 44 and 47 engage with the outer teeth on the respective drums 23 and 22. An operating fork 51 is provided for the clutch 48. Lubrication for the inner gears enters through the holes 52 in the drum carriers 24 and 25.

In operation assuming the clutch 48 to be free from the cones 45 and 47 and a load to be applied to the sprocket 28 then on rotation of the driven sprocket 26 the sun pinions will cause the cage pinions to rotate on their spindle, the cage remaining stationary with the sprocket 28. These cage pinions will cause their respective drums to revolve about them in the reverse direction of rotation to that of the shaft and these will be revolving at different speeds owing to the different sizes of the pinions. These drums will cause the pinions 44 and 47 to revolve thus driving the two cone members 45 and 47 respectively. On sliding the clutch member 48 into engagement with one of the clutch cones, say 47, a braking effect is applied to the drum 22 causing a turning effort to be produced at the sprocket 28 through the cage 13. As soon as the sprocket 28 commences to rotate, the rotation being in the same direction as that of the sprocket 26, the drum 22 may be slowed up and finally held from rotation by the complete engagement of the clutch 48 with the cone 47 and top gear will now be engaged. The drum 23 will be carried round slowly by the gears in the direction of rotation of the cage and sprockets. The operation of the parts when the other clutch cone is engaged will be very similar and will give the lower gear ratio.

What I claim and desire to secure by Letters Patent is:—

1. In epicyclic speed gears, a double epicylic train of gears of different ratios and having a common pinion cage, the internally toothed drum of each epicyclic gear train having external teeth, a countershaft mounted in the casing of the gear, two pinions mounted on the countershaft meshing respectively with the external teeth on the drums and means for controlling the rotation of the said two pinions individually.

2. An epicylic speed gear, comprising, in combination, a casing, a main driven shaft mounted for rotation in said casing, a pair of internally and externally toothed drums mounted for rotation on said shaft, a pair of sun-gears carried by shaft for rotation therewith, a pinion cage mounted for rotation on said shaft and carrying two series of planet pinions, one in mesh with one of said sun-gears and with the internal teeth of one of said drums, and the other in mesh with the remaining sun-gear and with the internal teeth of the other drum, the ratio of the train of gears of the two series being different, a countershaft mounted for rotation in said casing, a pair of pinions carried by said countershaft in mesh with the external teeth on the respective drums, and means for individually controlling the rotation of said pinions.

In testimony whereof I have signed my name to this specification.

WESTGARTH STANHOPE FORSTER BROWN.